United States Patent [19]

Foerster

[11] Patent Number: 4,683,972
[45] Date of Patent: Aug. 4, 1987

[54] STEERING SYSTEM WITH AUXILIARY FORCE ASSIST FOR VEHICLES IN WHICH A CENTRAL STEERING LIMIT VALVE IS CONNECTED WITH THE PUMP PRESSURE LINE OF A STEERING ASSIST PUMP

[75] Inventor: Hans-Joachim Foerster, Stuttgart, Fed. Rep. of Germany

[73] Assignee: Daimler-Benz Aktiengesellschaft, Fed. Rep. of Germany

[21] Appl. No.: 928,520

[22] Filed: Nov. 10, 1986

[30] Foreign Application Priority Data

Nov. 8, 1985 [DE] Fed. Rep. of Germany ....... 3539607

[51] Int. Cl.⁴ .............................................. B62D 5/06
[52] U.S. Cl. ..................................... 180/142; 180/141
[58] Field of Search ........................ 180/142, 141, 132

[56] References Cited
U.S. PATENT DOCUMENTS 4,473,128 9/1984 Nakayama et al. ................. 180/142
4,485,883 12/1984 Duffy ................................. 180/142
4,627,509 12/1986 Adam et al. ........................ 180/142

Primary Examiner—John J. Love
Assistant Examiner—Donn McGiehan
Attorney, Agent, or Firm—Barnes & Thornburg

[57] ABSTRACT

In a steering system with auxiliary force assist for vehicles, especially motor vehicles, steerable vehicle wheels are connected by way of a steering gear with a steering hand wheel as also with a pressure medium servo motor. A central steering limit valve which reduces the working pressure of the servo motor upon reaching a maximum value of the deflection angle of a steering wheel as fixed by mechanical end abutments at the vehicle, is connected directly with the pump pressure line of a steering assist pump connected with the servo motor and is also controllable by sensors influenced by the deflection angle. In order to be able to utilize the smallest possible turning radius with auxiliary force assist, without having to expose vehicle frame and steering linkage to high servo forces in the abutment positions, the sensors are arranged at the end abutments and produce a control signal changing with the deflection angle. An analog valve used as steering limit valve is so influenced by the control signal that the working pressure is reduced preferably in proportional dependence on the increase of the deflection angle.

4 Claims, 2 Drawing Figures

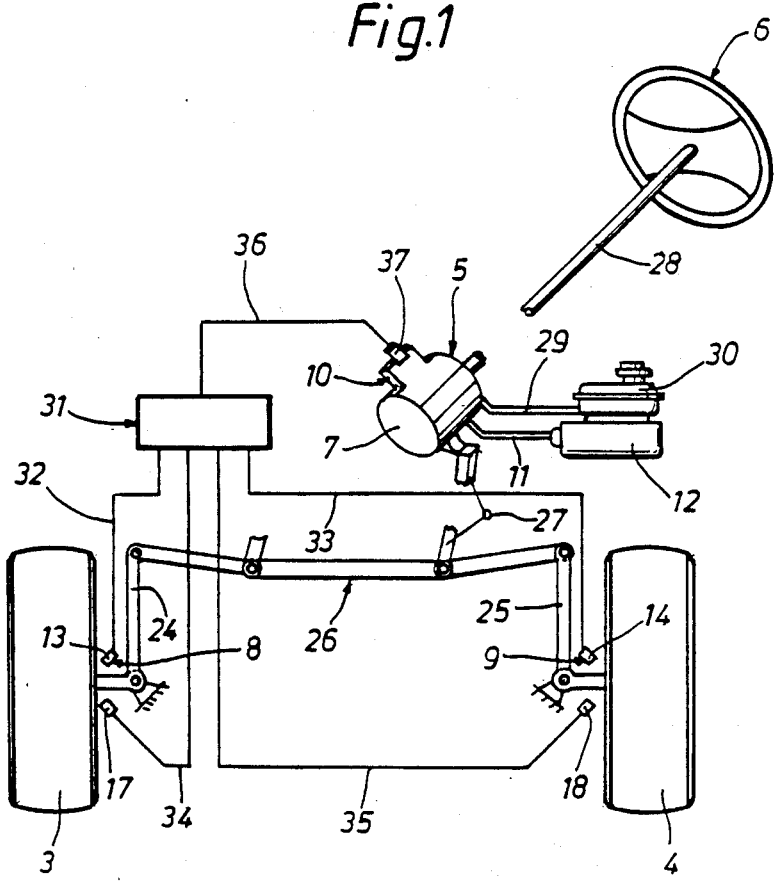

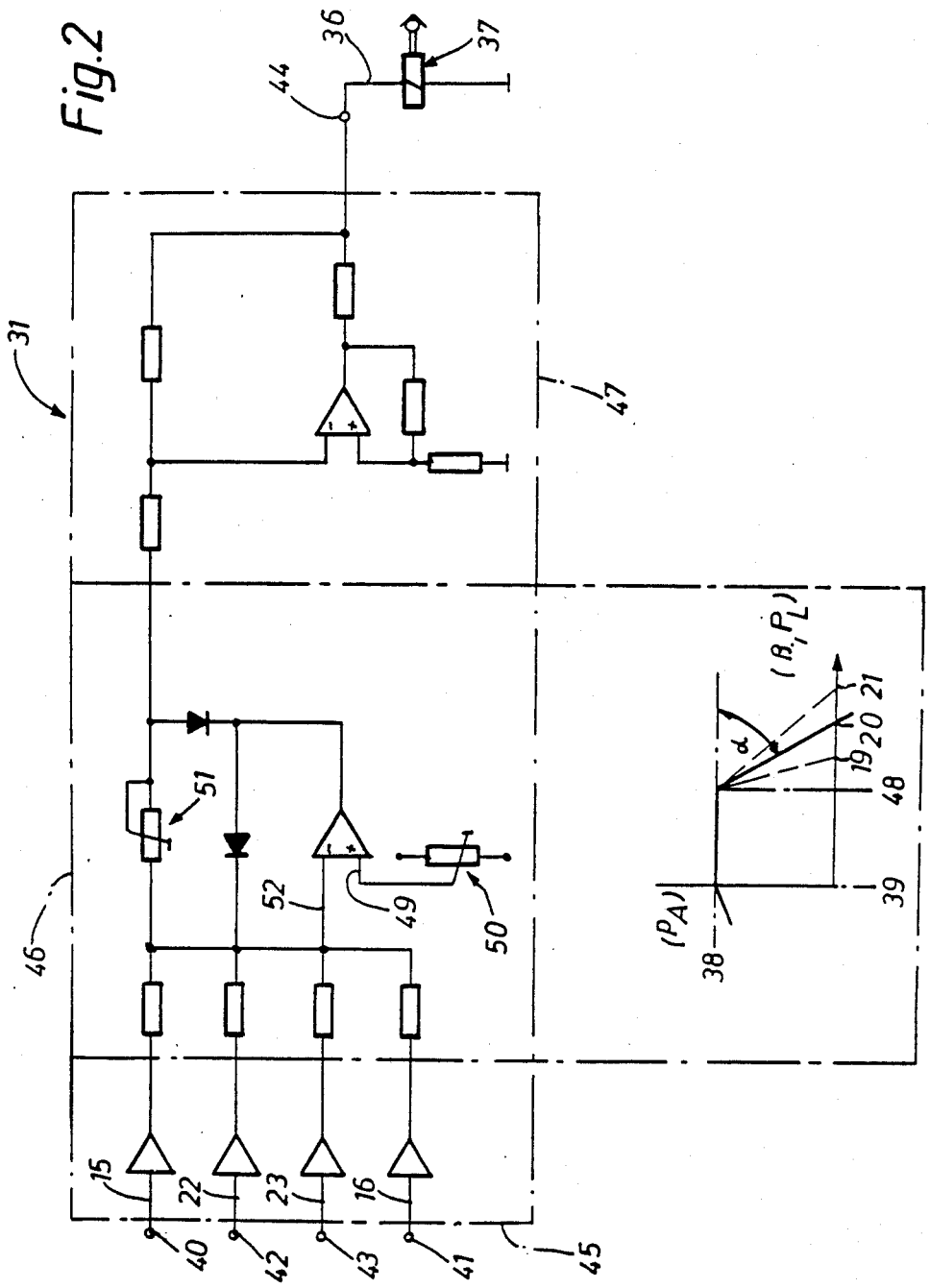

STEERING SYSTEM WITH AUXILIARY FORCE ASSIST FOR VEHICLES IN WHICH A CENTRAL STEERING LIMIT VALVE IS CONNECTED WITH THE PUMP PRESSURE LINE OF A STEERING ASSIST PUMP

The present invention relates to a steering system with an auxiliary force assist for vehicles, especially for motor vehicles, in which steerable vehicle wheels are drivingly connected by a steering gear with a manual steering wheel as also with a pressure medium-servo motor, and in which a central steering limit valve decreasing the working pressure of the servo motor upon reaching a maximum value of the deflection angle of a vehicle wheel determined by mechanical end abutments at the vehicle is connected directly with the pump pressure line of a steering assist pump connected with the servo motor and is controllable by sensors influenced by the deflection angle.

In a known steering system of this type (DE-OS No. 23 23 522), the working piston of the servo motor operates on a steering drop arm shaft or steering gear arm shaft which includes one cam each to push open two control valves constructed in the manner of check valves, which still prior to reaching the maximum value of the wheel deflection angle connect the respectively pressure-relieved working chamber of the servo motor with the central steering limit valve, as a result of which the latter connects the pump pressure line more or less suddenly with a pressure-relieved return line. The operating piston can then be displaced manually by means of the steering gear also operating on the steering drop arm shaft, beyond the disconnect points determined by the cams up to its end positions in order to be able to deflect the wheels maximally. In this manner, it is to be avoided, inter alia, that the control valves which are adapted to be pushed open by the cams, have to process the entire operating flow which flows from the steering control valve customarily interconnected between the servo motor and the steering assist pump to the acted-upon working pressure of the servo motor, in order to achieve the pressure reduction necessary for a steering limitation.

In a hydrostatic all-wheel steering system of non-analogous art (DE-OS No. 31 45 618), a sensor for the steering wheel deflection angle which is arranged at the steering linkage of a steering axle is connected for purposes of feedback with the input of a final amplifier operating on the control valve of the servo motor belonging to this steering axle, which is connected to the output of an electronic control unit processing, inter alia, the manually adjusted desired value of the steering angle and the instantaneous driving velocity, respectively, corresponding analog signals.

The present invention is concerned with the task to be able to utilize the smallest possible turning radius of the vehicle while maintaining the auxiliary force assist, however, without having to expose the vehicle frame and steering linkages in the abutment places of the deflected vehicle wheels to the high loads and stresses as a result of high a servo force.

The underlying problems are solved according to the present invention in that the sensor devices are arranged at the end abutments and produce a control signal changing with the deflection angle while an analog valve used as steering limit valve is influenced by the control signal in such a manner that the working pressure is reduced preferably proportional in dependence on the increase of the deflection angle.

In the steering system according to the present invention, the abutment of the front wheels is utilized in order to reduce the oil pressure from there. By reason of the distance between the wheels and the steering gear or the steering pump, it is advantageous to realize such an arrangement by way of electrical signals, whereby, of course, any other remote control such as pneumatic or mechanical or hydraulic remote control would also be feasible. A mere turning-off of the steering oil pressure upon reaching the abutment of the wheels is avoided by the present invention because otherwise the entire system built up by the forces would suddenly become relieved. In contrast, a gradual pressure reduction is achieved by the present invention when approaching the abutment. By the use of inductive displacement sensors or also force measuring cells or capacitive sensors which are so installed at the steering abutment that the last tenths of a millimeter of displacement lead to a gradual build-up of an electic voltage, these signals are conducted to an analog valve which now reduces the oil pressure of the main pressure line of the servo steering system proportional to the build-up of the voltage. The use of a very small analog valve with nearly linear characteristics is of advantage. The inter-relationship between force and voltage or displacement and voltage, when the wheel approach the abutment, and the pressure reduction of the servo steering system can be empirically tested and so matched that the vehicle driver has the feeling that he is now at the abutment, but can also hold this position.

The advantages of the present invention reside, in particular, in that the full utilization of the rotary angle of the steerable wheels and therewith a reduction of the turning radius to the smallest extent is achieved, and in that every special adjusting work at the control valves for determining the turn-off or disconnect points can be dispensed with, and in that furthermore, a reduction of the steering pressure to the magnitude necessary for the holding, a reduction of the driving power of the oil pump, a relief of the oil pump, and a relief of the steering gear, of the joints and of the linkages from excessively high forces are achieved as also the elimination of the pump noise which can still be heard in garages.

These and other objects, features and advantages of the present invention will become more apparent from the following description when taken in connection with the accompanying drawing which shows, for purposes of illustration only, two embodiments in accordance with the present invention, and wherein:

FIG. 1 is a schematic view of an arrangement of a steering system according to the present invention in two embodiments; and FIG. 2 is a diagram for the control of the analog valve of the steering system of FIG. 1 operating as steering limit valve.

Referring now to the drawing, and more particularly to FIG. 1, the steerable front wheels 3 and 4 of a motor vehicle are connected by way of steering levers 24 and 25 with a steering linkage 26 which is actuated by a steering gear arm 27 that is pivoted by a steering drop arm shaft of a servo steering system in which a mechanical steering gear generally designated by reference numeral 5 which is adapted to be driven by the steering shaft 28 of a manual steering wheel 6 and operates on the steering drop arm shaft, as also a pressure medium-axial piston-servo motor 7 which also operates on the steering drop arm shaft for purposes of achieving an auxiliary force assist, are structurally integrated in a steering gear housing. The steering gear 5 contains a control valve responding to angular deflections of rotations of the steering shaft 28 for adjusting the working pressure of the servo motor 7 which is connected by way of the control valve both with a steering assist pump 12 by a pump pressure line 11 as also with a pressure medium reservoir or tank 30 by way of a return line 29 whereby the steering assist pump 12 sucks pressure medium out of the pressure medium reservoir or tank 30.

Such a steering system is disclosed, for example, in the DE-OS No. 27 10 849.

Compared to this prior art servo steering system, the servo steering system of FIG. 1 differs at the outset by an additional electro-hydraulic analog valve 10 which is controlled by way of an electronic control unit generally designated by reference numeral 31 and which quasi controls a by-pass connection between the lines 11 and 29, and more particularly this by-pass connection is located upstream of the aforementioned control valve for the working pressure.

An electro-hydraulic analog valve is disclosed, for example, in the DE-PS No 22 06 751 for the control of the working pressure of an automatically shifted transmission for motor vehicles.

The maximum value of the respective wheel deflection angle of the front wheels on the inside of the curve is determined by end abutments 8 and 9 secured at the vehicle frame; a respective counter-abutment of the steering linkage 26 is operable to abut at these end abutments 8 and 9.

In the one embodiment of FIG. 1, one distance pick-up or transducer 13 or 14 each in the form of sensors is arranged at the end abutments 8 and 9 which each produce an increasing voltage signal 15, respectively 16 (FIG. 2) with increasing wheel deflection angle $\beta$, that is adapted to be applied by way of corresponding lines 32, respectively, 33 to the associated inputs of the control unit 31.

Finally, force transducers 17 and 18 in the form of sensors are arranged at the vehicle frame which measure the steering force at the respective vehicle wheel 3 and 4 on the curve outside; these force transducers thereby produce a voltage signal 22, respectively, 23 increasing with increasing steering force that is adapted to be applied to the corresponding inputs of the control unit 31. This takes place by way of corresponding lines 34 and 35.

The use of sensors 13 and 14 dependent on displacement, on the one hand, or of the force-dependent sensors 17 and 18, on the other, takes place selectively in each case.

The output of the control unit 31 is connected by way of a line 36 with the electromagnetic control part 37 of the analog valve 19.

According to FIG. 2, the control unit 31 includes a pre-amplifier 45, a summing amplifier 46 connected in the output of the pre-amplifier 45, and a current-controlling final stage 47 having an output 44 for the connection of the line 36 to the control valve 37. The pre-amplifier 45 is provided with inputs 40 and 41 for the displacement-dependent voltage signals 15 and 16 or with inputs 42 and 43 for the steering force dependent signals 22 and 23.

In the diagram illustrated for purposes of explaining the function of the summing amplifier 46, the working pressure $p_A$ of the servo motor 7 of the servo steering system is plotted against the steering angle $\beta$ (with the use of displacement-dependent sensors 13 and 14), respectively, against the steering force $P_L$ (with the use of force-dependent sensors 17 and 18). A pressure limit valve integrated into the steering assist pump 12 prevents the working pressure $p_A$ from rising above a maximum value 38 so that during the further deflection of the steering hand wheel 6 within the area between the steering angles 39 and 48, the steering force can further increase only by an increase of the manual steering force, whereby upon reaching the steering angle 48 located in proximity of the end abutment 8, respectively, 9, the working pressure $p_A$ is reduced by the analog valve 10 in such a manner that a gradual, respectively, decreasing course for the working pressure determined by the angle $\alpha$ is produced. The steering angle 48 as starting point for the pressure decrease is determined in the summing amplifier 46 by a comparison voltage signal 49 and is adjustable by means of a voltage divider 50. The angle $\alpha$ as degree of the pressure reduction with respect to the approaching of the deflected vehicle wheel 3, respectively, 4 to the associated end abutment 8, respectively, 9 is selectively fixable by an adjustable resistance 51 forming the output of the summing amplifier 46 so that the working pressure $P_A$ can be lowered to zero, for example, at one of the steering angles 19 to 21.

The arrangement may be so made that with a right deflection of the manual steering wheel 6, the vehicle wheel 3 is located on the inside of the curve and therewith the displacement sensor 13 produces a voltage signal 15 to the input 40 when approaching the end abutment 8 or the force pick-up sensor 18 of the wheel 4 on the outside of the curve produces a voltage signal 23 to the input 43 of the control unit 31.

If the corresponding voltage signal 52, which is amplified by the pre-amplifier 45, exceeds the comparison voltage signal 49, then the summing amplifier 46 controls the end stage 47 in such a manner that the analog valve 10 reduces the working pressure $P_A$ according to the undertaken adjustments (steering angle 48, reduction angle $\alpha$).

During a left deflection of the manual steering wheel 6, the displacement sensor 14, respectively, force sensor 17 then initiates a gradual decrease of the working pressure $p_A$ when the vehicle wheel 4 now on the inside of the curve approaches the end abutment 9.

While I have shown and described only two embodiments in accordance with the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A steering system with an auxiliary force assist for vehicles in which vehicle wheels are drivingly operatively connected by a steering gear means with a manual steering wheel and also with a pressure medium servo motor means, comprising steering limit valve means operable to reduce the working pressure of the servo motor means upon reaching a maximum value of the deflection angle of a vehicle wheel as determined by mechanical end abutment means at the vehicle, a steering assist pump means operatively connected with the servo motor means including a pump pressure line, said steering limit valve means being connected with said pump pressure line and being operable to be controlled by sensor means influenced by the deflection angle, said sensor means being arranged at the end abutment means and being operable to produce a control signal varying with the deflection angle, and said steering limit valve means being an analog valve means operable to be influenced by the control signal in such a manner that the working pressure is reduced as a function of the increase of the deflection angle.

2. A steering system according to claim 1, wherein the working pressure is reduced in proportional dependence to the increase of the deflection angle.

3. A steering system according to claim 1, wherein the sensor means are force pick-up means measuring the steering force at the vehicle wheel.

4. A steering system according to claim 1, wherein the sensor means are displacement pick-up means arranged at the end abutment means and operable to produce an increasing voltage signal with increasing wheel deflection angle.

* * * * *